United States Patent [19]

Suga

[11] Patent Number: 4,811,276

[45] Date of Patent: Mar. 7, 1989

[54] VIRTUAL COMPUTER DIAGNOSTIC SYSTEM WITH COMPARATIVE MONITORING OF TIMESTAMPED CONTROLLER CHECK SIGNALS AND TIMESTAMPED COMMANDS OF INDIVIDUAL VIRTUAL MACHINES

[75] Inventor: Tosimasa Suga, Yokohama, Japan

[73] Assignee: Hitachi, Ltd., Tokyo, Japan

[21] Appl. No.: 946,947

[22] Filed: Dec. 29, 1986

[30] Foreign Application Priority Data

Dec. 26, 1985 [JP] Japan ................................ 60-296694

[51] Int. Cl.[4] .......................... G06F 1/30; G06F 9/46
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,347,565 | 8/1982 | Kaneda et al. | 364/200 |
| 4,400,769 | 8/1983 | Kaneda et al. | 364/200 |
| 4,456,954 | 6/1984 | Bullions, III et al. | 364/200 |
| 4,459,661 | 7/1984 | Kaneda et al. | 364/200 |
| 4,475,156 | 10/1984 | Federico et al. | 364/200 |
| 4,494,189 | 1/1985 | Bean et al. | 364/200 |
| 4,589,093 | 5/1986 | Ippolito et al. | 364/900 |
| 4,674,038 | 6/1987 | Brelsford et al. | 364/200 |
| 4,689,739 | 8/1987 | Federico et al. | 364/200 |

Primary Examiner—Raulfe B. Zache
Assistant Examiner—Leo L. Wang
Attorney, Agent, or Firm—Antonelli, Terry & Wands

[57] ABSTRACT

Operating systems of virtual machines periodically issue diagnostic instructions during the normal operation. A virtual machine control monitor selects the earliest one of monitoring times for virtual machines and sets it in the clock facility in a bare machine. If the monitor receives the diagnostic command from a virtual machine before expiration of the monitoring time, it re-sets the clock facility. Otherwise, the monitor issues a machine check interrupt command to the virtual machine in which the monitoring time has expired.

9 Claims, 5 Drawing Sheets

VIRTUAL COMPUTER DIAGNOSTIC SYSTEM WITH COMPARATIVE MONITORING OF TIMESTAMPED CONTROLLER CHECK SIGNALS AND TIMESTAMPED COMMANDS OF INDIVIDUAL VIRTUAL MACHINES

BACKGROUND OF THE INVENTION

This invention relates to the monitoring control for a virtual machine system and, particularly, to a method and apparatus for monitoring a virtual machine system suitable for automatically detecting abnormalities in the operating systems (OSs) which run in the virtual machine system.

The structure of the time of day TOD and the clock comparator and operation related to the set clock comparator SCKC and the diagnose DIAG instruction in a bare machine are described in publication: IBM System/370 Principle of Operation, GA22-7000. The structure and operation of the virtual machine are described in JP-A Nos. 56-33736 and 55-42326. A virtual computer system is used on a time sharing basis, and user-defined virtual hardware information relating to control registers, arithmetic registers and PSWs is set on the actual hardware system, and service of an actual computer is available for the user.

In a virtual computer system as shown in FIG. 1, a host or a bare machine 11 provides software with a bare machine interface 12 capable of handling process requests in priviledged or non-priviledged modes. A VM monitor 13 operates by using the bare machine interface 12 provided by the bare machine 11 and implements the simulation of priviledged instruction of virtual machines and the scheduling for virtual machines. The VM monitor 13 provides other VM interfaces 18 and 19 for allowing the operation of operating systems 16 and 17 running in respective virtual machines. Although only two virtual machines are shown in FIG. 1, more virtual machines generally exist in practical systems. The operating systems 16 and 17 run by using the VM interfaces 18 and 19 provided by virtual machines 14 and 15, and seem as if they operate in the bare machine 11 when seen from user programs 22-25. The operating systems 16 and 17 are capable of providing extended machine interfaces (EM interfaces) 18-21 for the user programs 22-25. Extended machines 26-29 have a function of executing in an operating system 16 or 17 specific interrupt processes such as for supervisor call from a user program which is run under the operating system and a processing function of machine instructions in a non-priviledged mode.

On this account, a plurality of operating systems can apparently run concurrently on a single bare machine, whereby the hardware resources can be used more efficiently and newly developed systems can be tested without suspending other services in operation.

For a virtual computer system in which a plurality of virtual machines are running in an online mode, it is necessary to enhance the reliability of operation by detecting abnormalities of operating systems immediately so as to minimize their influences. A bare machine is equipped with a control monitor (CM), which checks the diagnose instruction or command issued by the operating system at a constant interval and, if it does not receive the command for a certain time length, the monitor raises a machine check interrupt so as to detect an abnormality such as a failure of hardware or a "bug" in the operating system. However, only a single control monitor is equipped for the bare machine, and therefore it cannot monitor a plurality of operating systems running in the virtual machine system. Although it would be possible to monitor a specific operating system by providing the system with a control monitor dedicated to that operating system, such a control monitor fails to perform its inherent role of monitoring the bare machine and system abnormalities caused by bugs in the operating system and failures of related hardware devices will appear as a defective service for the user.

SUMMARY OF THE INVENTION

An object of this invention is to provide a monitoring control system for a virtual machine system capable of automatically and concurrently detecting abnormalities of a plurality of operating systems running in the virtual machine system.

Another object of the invention is to make possible the operation of a plurality of real-time systems with virtual machine monitoring facilities in a virtual computer system.

Still another object of the invention is to provide a virtual machine system or computing system capable of automatically testing a plurality of operating systems having virtual machine or virtual processor monitoring facilities.

Monitoring timers which measure the monitoring time in response to monitor commands issued by operating systems in respective virtual machines in a virtual machine system are provided in correspondence to the virtual machines in a control monitor which monitors the virtual machines. Each virtual monitoring timer enters the monitoring mode by receiving a monitor command from the operating system of the associated virtual machine. The operating system of the virtual machine issues the monitor command at a constant interval to maintain the operation of the monitoring timer. If the monitor command is not issued for a certain time length due to an abnormality in the operating system, the control monitor imparts the failure of command reception to the operating system.

DESCRIPTION OF THE PREFERRED EMBODIMENTS

An embodiment of this invention will now be described with reference to the drawings.

Figure 1:
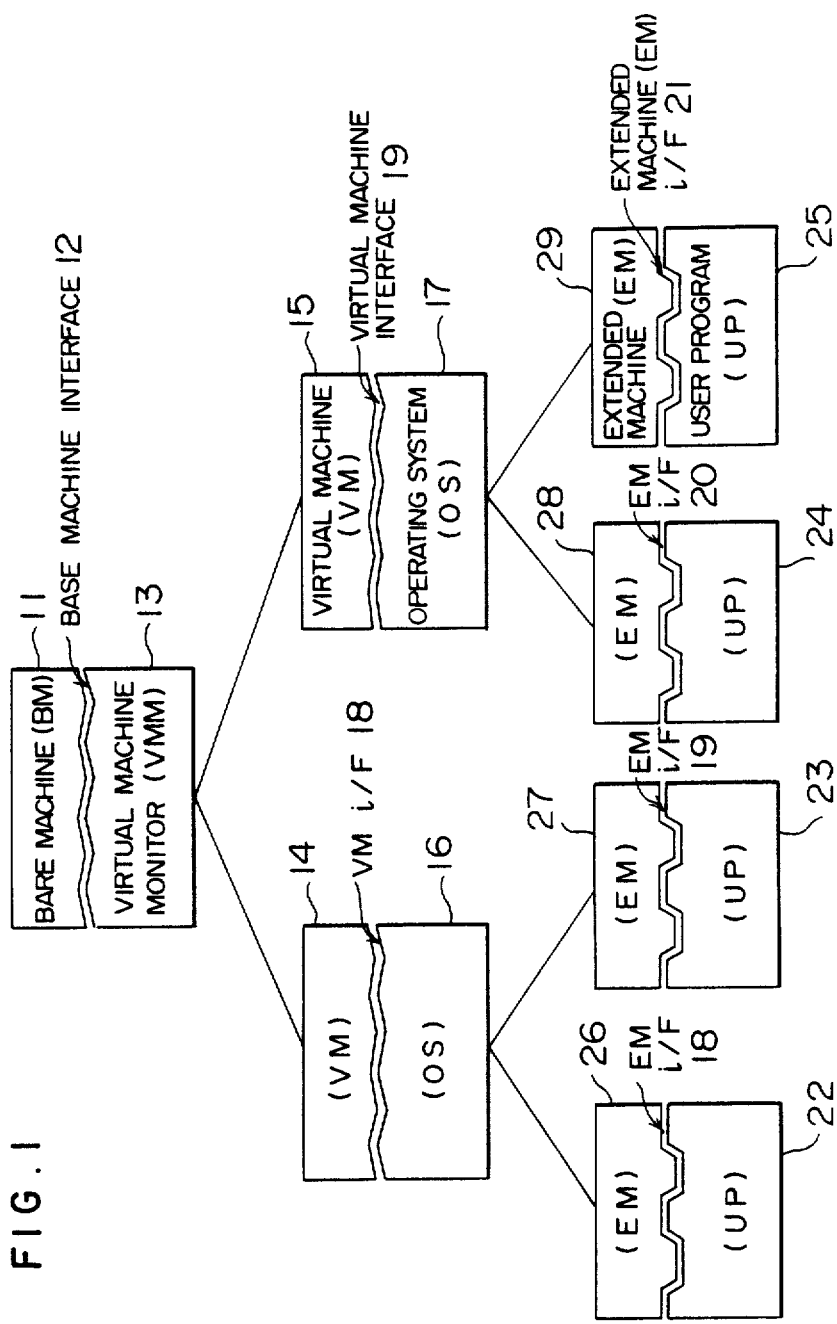
FIG. 1 is a block diagram showing a bare machine which supports virtual machines.
Figure 2:
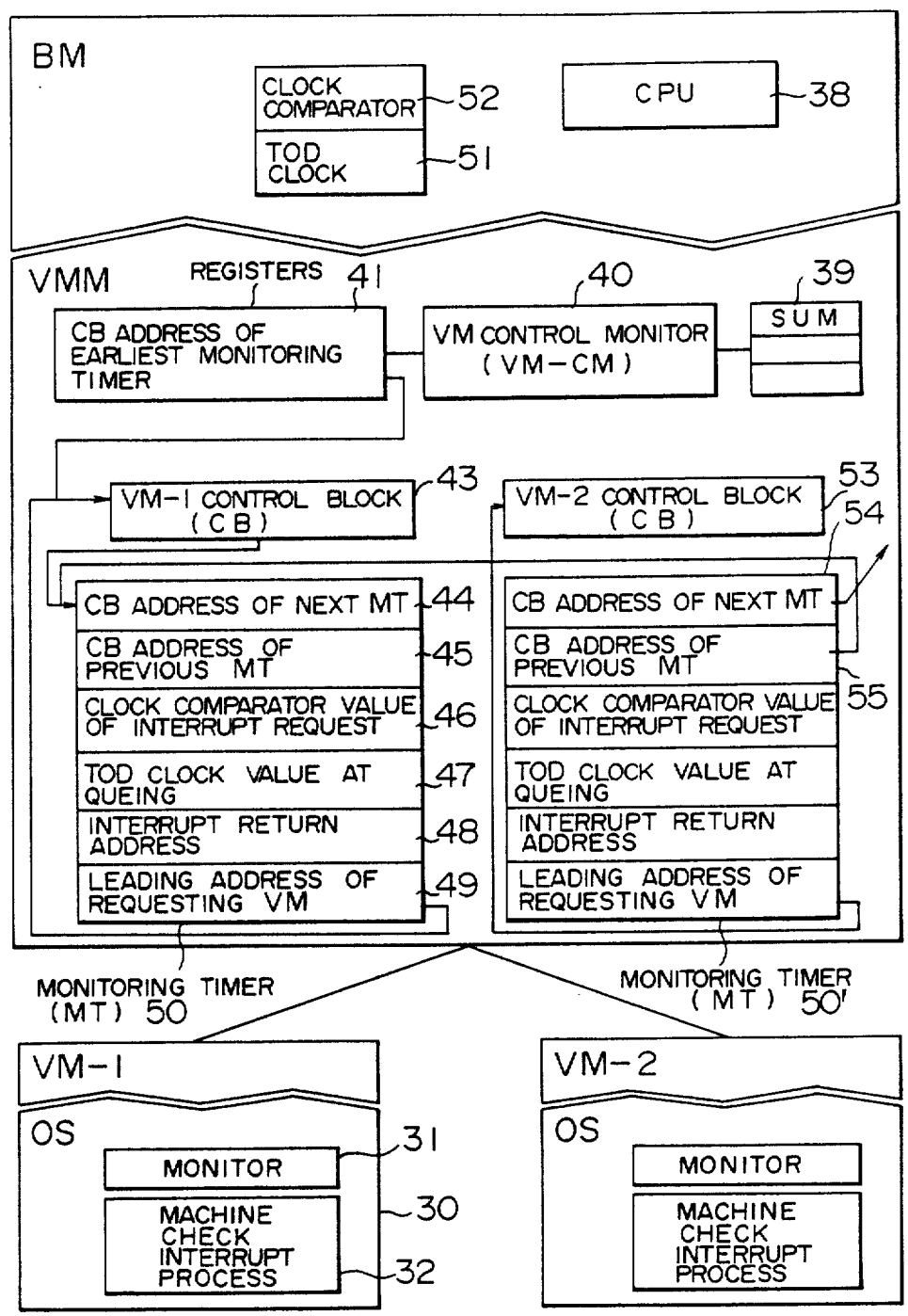
FIG. 2 is a block diagram showing the VM control monitor according to this invention.
Figure 9:
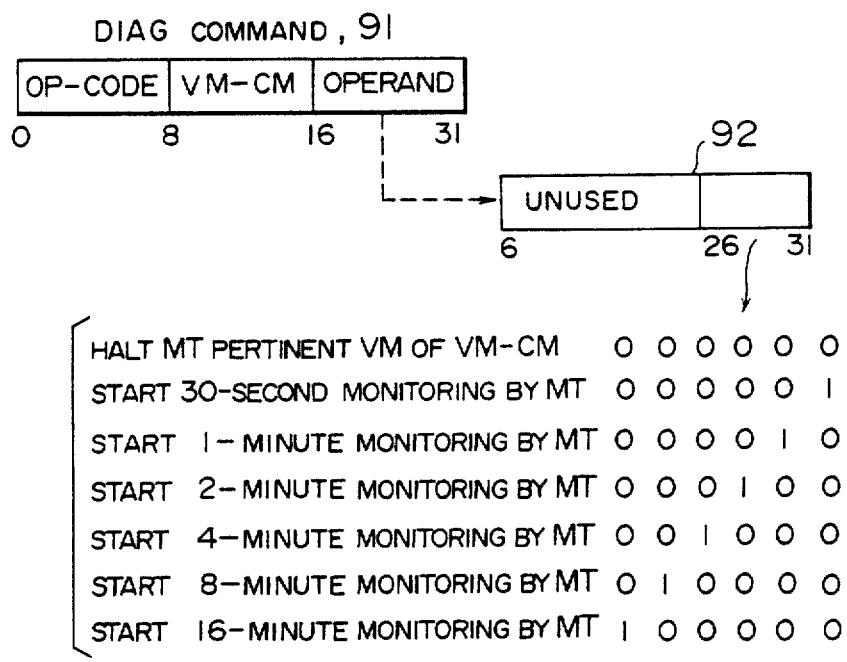
FIG. 9 is a diagram showing the format of the DIAG command and the coding of the monitoring timer.

In FIG. 2, an operating system 30 of a virtual machine VM-1 has a monitor 31 which issues a diagnose instruction (DIAG), a priviledge instruction, at a constant interval. The DIAG instruction or command can be identified from the OP code shown in FIG. 9. A VM control monitor (VM-CM) 40 for monitoring a plurality of virtual machines operates on a CPU 38 in the bare machine to simulate the DIAG command received from a virtual machine. At the simulation, the value of the TOD clock 51 is placed in a register 47 within a monitoring timer (MT) 50. The monitoring time length t1 which is expected for the virtual machine is determined depending on the use and resources of the virtual machine. For an online operation, the period t1 can be set shorter, e.g., one minute (with the low-order 6 bits of the address of the operand of DIAG being 000010 in FIG. 9), or much shorter. The value of t1 has been preset at the generation of the operating system of the virtual machine in accordance with the user's specification. The value of t1 after a necessary addition (discussed below) is set in a register 46 within the monitoring timer 50 after the simulation of the DIAG command by the VM-CM.

Figure 4:
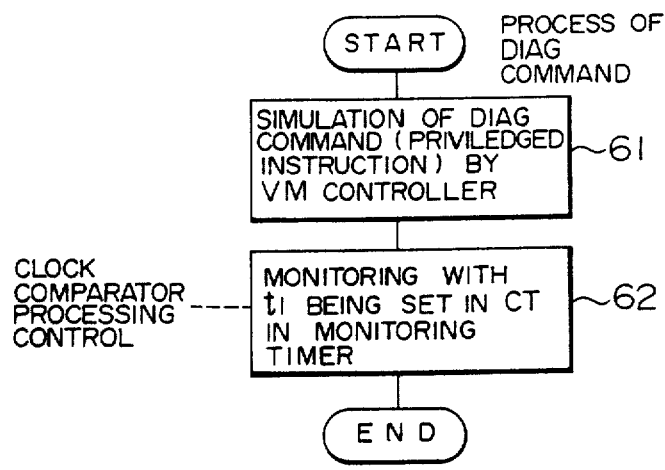
FIGS. 4, 5 and 6 are flowcharts showing the operation of the VM control monitor and the operating system of a virtual machine.
Figure 5:
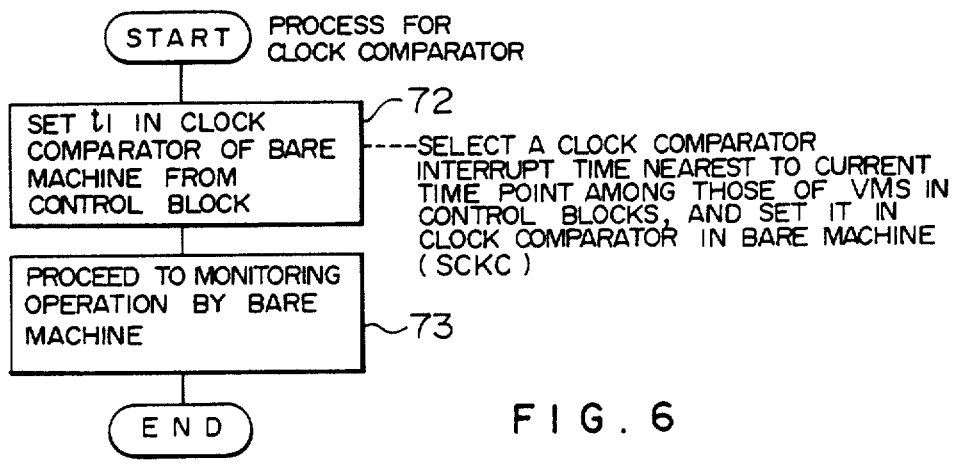
Figure 6:
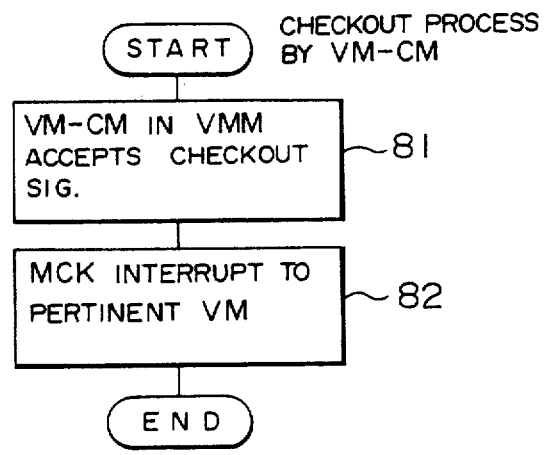
Figure 7:
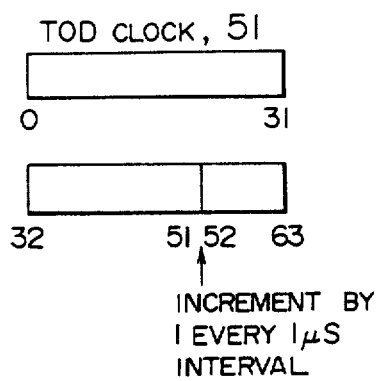
FIGS. 7 and 8 are diagrams showing the format of the TOD clock and the value of the clock comparator.

FIGS. 4 and 5 show the flowcharts of the program for the process using the bare machine TOD clock 51 (FIG. 7) and a clock comparator 52 connected to the TOD clock. After simulation of the DIAG, the value t1 indicated by the DIAG command to the VM-CM is added to the value of the TOD clock and is set in the register 46 within the monitoring timer 50 (step 72). The added value is compared with the contents of the other registers 46 of other monitoring timers and the added values are rearranged in the order of time (ascending order of time). This rearrangement is carried out by controlling the values of the two registers by the VM-CM. For example, when the sum for the monitoring time of VM-2 is smaller than that of VM-1, the register 44 which is to set the control block (CB) address of the next monitoring timer is given the address of CB 53 of VM-2, while the register 55 of the monitoring timer for VM-2 is given the address of CB 43 of VM-1. In this way, monitoring timers of all virtual machines are linked like a chain. If the result of addition for the monitoring time for VM-3 (not shown) is the earliest, the address of the control block of VM-3 is set in the register 41. If the clock comparator value of the VM-2 is the smallest, the CB address in the register 54 is set at a predetermined value, for example, zero.

As shown in step 72 in FIG. 5, the earliest addition result is set by the set clock comparator (SCKC) instruction in the clock comparator 52 of the bare machine, and the system enters the monitoring mode which waits for the TOD clock in the bare machine to exceed the value of the clock comparator. (Step 73 in FIG. 5).

Figure 3:
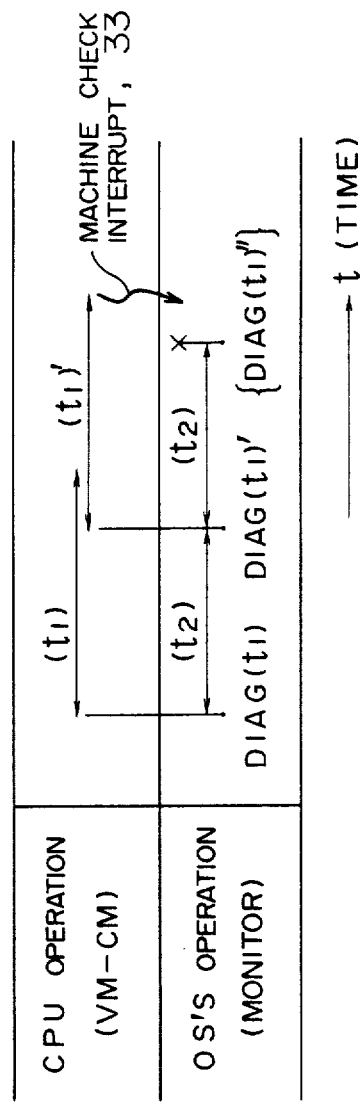
FIG. 3 is a diagram showing the timing relationship between the VM control monitor and the operating system of a virtual machine.
Figure 8:
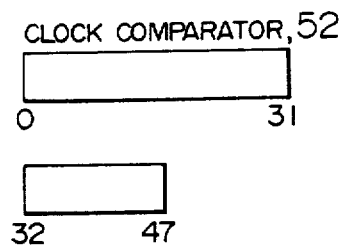

During the monitoring mode, when the VM-CM receives DIAG(t1)' from a normal virtual machine before expiration of time t1 (see FIG. 3), the process for the diagnose command in FIG. 4 is repeated, a new addition result is compared with the contents of registers 46 of the monitoring timers 50, rearrangement is made, a new earliest time is set in the clock comparator 52 of the bare machine, and the system enters the next monitoring mode (the period shown by the arrow (t1)' in FIG. 3). The comparison takes place between all 48 bits of the clock comparator 52 in FIG. 8 and the high-order 48 bits of the TOD clock 51 in FIG. 7.

In case the operating system cannot issue DIAG(t1)" (FIG. 3) due to an abnormality of the operating system of VM-1, e.g., some kind of bug in a disable loop or enable loop, or a hardware abnormality in a related processor, the clock comparator 52 of the bare machine issues a checkout signal to the VM-CM 40 (step 81 in FIG. 5). The VM-CM 40 operates on the register 41 to generate a machine check interrupt (MCK INT) using the starting address 49 of the requesting virtual machine based on the CB address of the virtual machine (33 in FIG. 3; step 82 in FIG. 5). The return address to the VM-CM has been set in advance in the register 48. Upon receiving the MCK-INT, the machine check interrupt processor 32 excecutes a necessary counter action, e.g., halting of VM-1, checking of the software table, and notification to the user.

I claim:

1. A virtual machine system including a plurality of virtual machines each having an operating system, said virtual machine system comprising:
    (a) check signal issuing means operated by a virtual machine control monitor which controls said virtual machines for counting a first predetermined time period and for issuing a check signal to a virtual machine on expiration of said first predetermined time period;
    (b) command issuing means provided in each of said operating system of said virtual machines and each responsive to an instruction from said operating system for issuing a command at second predetermined time intervals which are shorter than said first predetermined time period;
    (c) restarting means responsive to said command issuing means for restarting the counting of said first predetermined time period by said check signal issuing means when said command is issued by said command issuing means; and
    (d) interrupt means responsive to said check signal for issuing an interrupt to a virtual machine is said command issuing means fails to issue a command at the expiration of a second predetermined time interval.

2. A virtual machine system according to claim 1 further comprising:
    register means provided for each virtual machine and controlled by said restarting means for storing a value of said first predetermined time period given by said command and a time of reception of said command; and
    means for adding said reception time to said value of said first predetermined time period, for comparing a result of addition of said reception time and said first predetermined time period of each virtual machine with a corresponding result of addition in said other virtual machines, and for arranging control blocks of said virtual machines in the ascending order of said addition results.

3. A virtual machine system according to claim 2 further comprising in each of said virtual machines a processing means for checking for abnormalities in the operation of the virtual machine in response to an interrupt issued by said interrupt means.

4. A virtual machine system according to claim 3, wherein said system has a time-of-day clock for determining said first predetermined time period.

5. A virtual machine system including a plurality of virtual machines each having an operating system, said virtual machine system comprising:
    (a) a bare machine including a CPU, and means including a clock and clock comparator means connected to said clock for producing a signal when the value of said clock exceeds a predetermined time;

(b) a virtual machine control monitor having means including a plurality of control blocks for monitoring said virtual machines and registers connected to said control blocks;

(c) monitoring timer means for each virtual machine, each including first and second registers, for setting in said first register a value of a first predetermined time given by a diagnostic command issued by the operating system of a virtual machine and for setting in said second register the value of said clock at issuance of said diagnostic command;

(d) addition means for producing sums by adding respective values of said clock as stored in said second registers to respective values of said first predetermined time as stored in said first registers;

(e) means for setting in said clock comparator a value which represents an earliest time among the sums produced by said addition means; and (f) means for issuing a machine check interrupt signal to a virtual machine corresponding to said earliest time among said plurality of virtual machines in response to said signal produced by said clock comparator means.

6. A virtual machine system according to claim 5, wherein each of said virtual machines has in the operating system thereof monitor means for issuing said diagnostic command at second predetermined time intervals which are shorter than said first predetermined time in response to an instruction from said operation system, and said virtual machine control monitor has means for operating said monitoring timer means, said addition means and said setting means at each reception of said diagnostic command.

7. A virtual machine system according to claim 5, wherein each of said virtual machines has means for appending a code representative of said first predetermined time to said diagnostic command, and means for indicating detection of a set value of said first predetermined time appended to a diagnostic command which has already been given to said virtual machine control monitor from each of said virtual machines.

8. A method of monitoring a plurality of virtual machines running in a virtual machine system, said method comprising the steps of:

(a) monitoring on a time basis a specific command issued at a certain interval by an operating system of each virtual machine; and (b) indicating an interrupt operation for a machine check to the operating system of a virtual machine if said specific command has not been issued by the operating system within a certain time longer than said certain interval.

9. A virtual machine monitoring method according to claim 8, wherein said interrupt operation indicating step (a) comprises a sub-step (a1) of setting the value of said certain interval specified by said specified command in a timer within said virtual machine system, and a sub-step (a2) of repeating the first-mentioned sub-step (a1) of timer setting in response to the issuance of said specific command.

* * * * *